Figure 1:
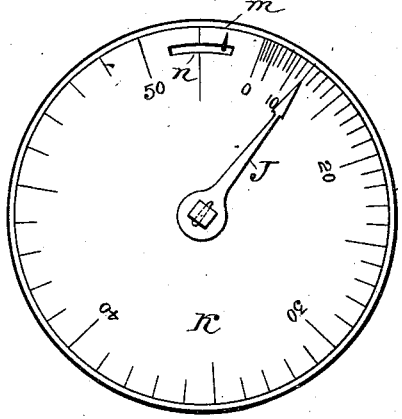

(No Model.)

H. H. CUNYNGHAME, F. L. RAWSON & O. E. WOODHOUSE.
INSTRUMENT FOR MEASURING ELECTRIC CURRENTS.

No. 450,221. Patented Apr. 14, 1891.

Witnesses
H. W. Elmore
Fred V. Fischer

Henry Hardinge Cunynghame
Otway Edward Woodhouse
Frederick Lawrence Rawson
Inventors.

By their Attorney
Geo. H. Benjamin

UNITED STATES PATENT OFFICE.

HENRY HARDINGE CUNYNGHAME, FREDERICH LAWRENCE RAWSON, AND OTWAY EDWARD WOODHOUSE, OF LONDON, ENGLAND.

INSTRUMENT FOR MEASURING ELECTRIC CURRENTS.

SPECIFICATION forming part of Letters Patent No. 450,221, dated April 14, 1891.

Application filed April 1, 1887. Serial No. 233,340. (No model.) Patented in England June 7, 1883, No. 2,832.

*To all whom it may concern:*

Be it known that we, HENRY HARDINGE CUNYNGHAME, FREDERICH LAWRENCE RAWSON, and OTWAY EDWARD WOODHOUSE, subjects of the Queen of Great Britain, and residents of London, county of Middlesex, England, have invented certain new and useful Improvements in Instruments for Measuring Electric Currents, (for which we have obtained a patent in Great Britain, No. 2,832, bearing date June 7, 1883,) of which the following is a specification.

Our invention relates to instruments for measuring electric currents transmitted through them, and of that class known as "ammeters" and "voltmeters," the first-named instrument having for its object to measure the quantity of the current, and the second the potential or electro-motive force of the current.

Our device consists, essentially, of an electro-magnet having oppositely-arranged horizontally-adjustable polar extensions, between which and mounted upon a vertical axis is a soft-iron armature shaped as an ellipse, connected to a torsion-spring and carrying an index. The arrangement of the armature as regards the polar extensions of the electro-magnet is such that by reason of the controlling force of the spiral spring, and when no current is passing the axis of the armature makes an angle less than a right angle with the axis of the polar extensions. Thus when the pull of the magnet is the greatest the axis of the armature will quite or nearly coincide with the axis of the polar extensions. The torsion-spring is capable of adjustment by hand to an extent determined by an index until its torsion exactly balances the attractive force on the armature. The position of the adjustable pointer on the dial will thus indicate the strength of the current. For convenience of indication—that is, so that the quantity or electro-motive force of the current can be read directly—we graduate the dial into divisions, which divisions increase in width around the scale. The torsion of the spring on the armature must be increased with the current transmitted through the instrument. Theoretically the torsional strain exerted should be proportional to the square of the current transmitted through the instrument, as will be readily understood by those skilled in the art to which this specification is directed. It is, however, inconvenient to divide the scale to indicate such a proportion. Hence an arbitrary division is arrived at, the strength of the torsional spring being a known factor. As the strength of the spring may be varied, the divisions upon the scale will be varied in accordance with it.

Figure 2:
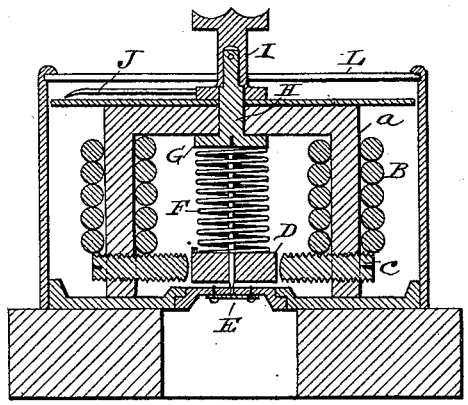
Figure 3:
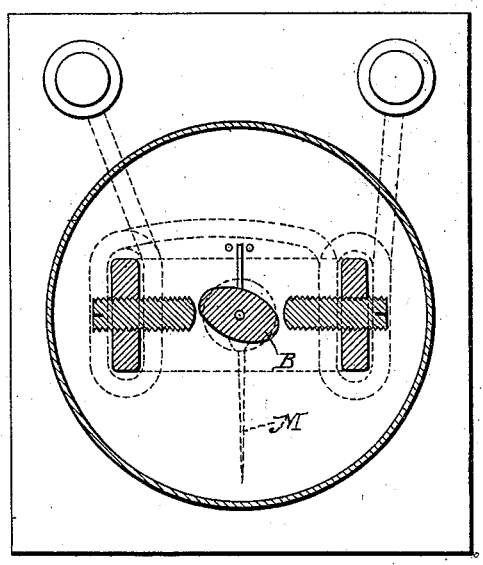

In the drawings, Figure 1 is a plan of a dial graduated by divisions proportional to the squares and the numbers to which they are marked. Fig. 2 is a vertical section of our improved device. Fig. 3 is a sectional plan of the same.

Similar letters of reference indicate like parts.

$a$ is a horseshoe-magnet having its coils B in the circuit. From its two limbs project two adjustable iron screws C, which constitute poles, the polar extensions presented toward a soft-iron armature D of elliptical form.

The object of making the polar extensions adjustable is that the scale of divisions indicating the quantity or potential of current can be varied at pleasure, as will be readily understood, by reason or the well-known law—*i. e.*, the attractive force of the magnet varies inversely as the square of the distance. The armature is fixed on the vertical axis E. To the inner side of the armature is connected by one end the coarse spring F, the other end of which is attached to a disk G. This disk is on a stem H, extending upward, and on which is arranged the button I, by which it can be turned by hand, so as to give the spring F greater or less torsion. The spring carries the index-pointer J, which moves over the graduated dial K on the front of the instrument and under the glass face L. From the armature D a light pointer-finger $m$ bends upward and presents its point through a slot $n$ cut through the dial K.

The operation of the device is as follows: When the magnet is excited by the current passing through its coils, the attraction of its poles C for the armature-poles approximating thereto tends to bring the axis of the armature into the same plane as the axis of the magnet-poles, and the index M thus bears against one end of the slot L. By turning the button I the observer changes the torsive force of the spring F until it balances the attractive force of the magnet on the armature, as indicated by the point of the index-finger M moving to the middle of the slot N. The position of the index-pointer then shows on the dial the current strength. If desired, variations in the coils of the instrument can be made to adapt it for use as a voltmeter or ammeter. It is not necessary to describe such modifications, as they will be evident to any one skilled in the art.

Having thus described our invention, what we claim, and desire to secure by Letters Patent, is—

1. In an electric-current-measuring device, the combination of an electro-magnet having oppositely-arranged poles, an armature mounted on a vertical axis between said poles, the horizontal axis of which corresponds to that of the electro-magnet, and a torsional spring connected to said armature, substantially as described.

2. In electrical measuring instruments, the combination of an electro-magnet having oppositely-arranged poles, an armature between said poles, the horizontal axis of which corresponds to that of the electro-magnet, a torsional spring connected with said armature, and the means for increasing and decreasing the torsion of the spring, substantially as described.

3. In an electrical measuring instrument, the combination of an electro-magnet, an armature between the poles thereof, a torsional spring, a torsion-regulator for said spring, and a pointer connected to the armature, whereby the difference between the torsion of the spring and the strength of the electric current transmitted through the instrument is indicated, substantially as set forth.

4. In an electrical measuring instrument, the combination of an electro-magnet provided with adjustable poles, an armature between said poles, the horizontal axis of which corresponds to that of the magnet, a torsional spring connected to said armature, a device for regulating the torsion of the spring, and a device for indicating the movement of the armature, substantially as described.

5. In an electrical measuring instrument, the combination of an armature, a torsional spring, a device for regulating the torsion of the spring, a pointer for indicating the degree of the torsion, and a pointer which indicates the difference between the current passing through the instrument and the torsion of the spring, substantially as set forth.

6. In an electrical measuring instrument, the combination of an electro-magnet provided with adjustable poles, an elliptical armature between said poles, the horizontal axis of which corresponds to that of the electro-magnet, and devices for regulating and indicating the movement of said armature, substantially as described.

In testimony whereof we have hereunto subscribed our names this 31st day of January, A. D. 1887.

HENRY HARDINGE CUNYNGHAME.
FREDERICH LAWRENCE RAWSON.
OTWAY EDWARD WOODHOUSE.

Witnesses to the signatures of Henry Hardinge Cunynghame and Frederich Lawrence Rawson:
WM. THOS. MARSHALL,
J. TOWNSEND THOMPSON,
*Both of 2 Popes Head Alley, Cornhill, London, Gentlemen.*

Witnesses to the signature of Otway Edward Woodhouse:
ROBERT PAUL KITSON,
1 *Vaughan Parade, Torquay, Articled Law Clerk.*
EMILY CHICK,
1 *Abbey Crescent, Torquay, Trained Nurse.*